No. 681,486. Patented Aug. 27, 1901.
B. POULSON.
MECHANICAL MOVEMENT.
(Application filed Mar. 26, 1900.)
(No Model.)

WITNESSES: Britton Poulson INVENTOR
BY H. C. Hartman
his ATTORNEY.

UNITED STATES PATENT OFFICE.

BRITTON POULSON, OF FORT WAYNE, INDIANA.

MECHANICAL MOVEMENT.

SPECIFICATION forming part of Letters Patent No. 681,486, dated August 27, 1901.

Application filed March 26, 1900. Serial No. 10,230. (No model.)

*To all whom it may concern:*

Be it known that I, BRITTON POULSON, a citizen of the United States, residing at 108 Spy Run avenue, in the city of Fort Wayne, in the county of Allen, State of Indiana, have invented a new and useful Mechanical Movement, of which the following is a specification.

My invention relates to mechanical movements by which rotary motion is converted into rectilinear motion; and the objects of my invention are, first, to provide improved mechanism therefor; second, to provide means whereby the movement of the driving-shaft shall be with greater force with expenditure of less power, and, third, to provide such mechanism and construction that the device may be more readily and easily applied to operate other mechanism. I attain these objects by the mechanism illustrated in the accompanying drawings, in which—

Figure 1:
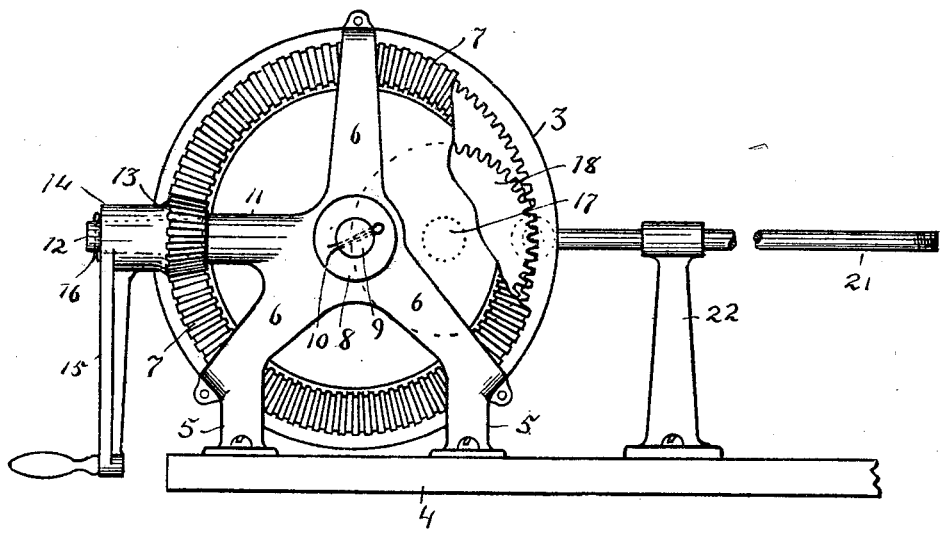
Figure 2:
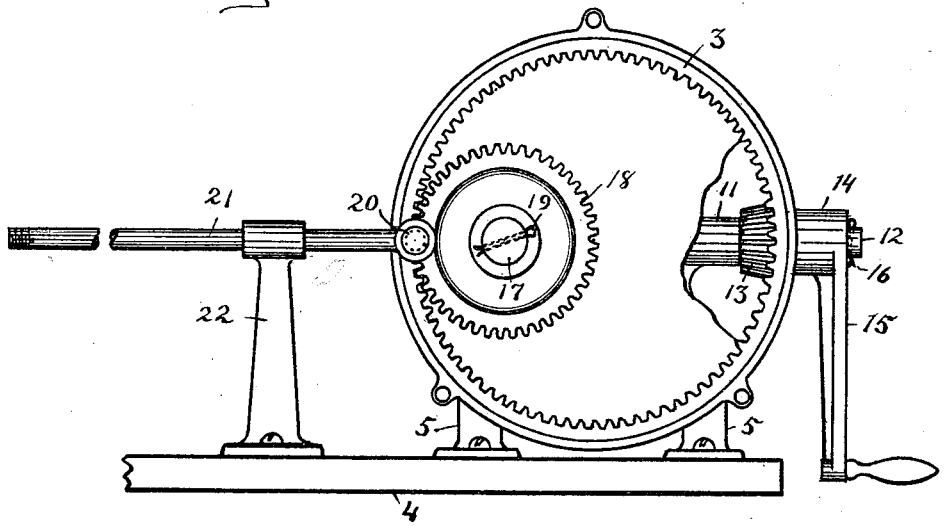

Figure 1 is a side elevation of the device, and Fig. 2 is a side elevation showing the reverse side.

Similar numerals of reference refer to similar parts throughout both views.

In the drawings numeral 3 indicates the internal gear-wheel, which is held in fixed position to the supporting-frame 4 by means of the bracket 5, which is provided with three arms 6 6 6, the ends of which are bent inwardly, (see Fig. 1,) so as to provide a space for the large bevel gear-wheel 7 to revolve between the arms and the internal gear-wheel. This construction also provides a support for the large bevel gear-wheel 7. In the drawings such support consists of a boss 8, placed centrally to the internal gear 3, through which an orifice is made to form a bearing for a central shaft or stud 9, attached to the large bevel gear-wheel 7, forming its axle, which axle is secured in place by a split pin 10. This bracket 5 is also provided with an arm 11, the end of which is constructed to form a spindle 12, upon which the small bevel-pinion 13 is mounted, so as to mesh with the bevel-gear 7. For means of operating this bevel-pinion 13 a sleeve 14, provided with a crank-handle 15, is attached to it, preferably integrally, and mounted on the spindle 12 and held in place by a split pin 16. The bevel gear-wheel 7 is provided on its reverse side, between its center and perimeter, with a stud 17, upon which is mounted a pinion 18, meshing with the internal gear 3 and held in place by a split pin 19. The pinion 18 is provided with a wrist or stud 20, the center of which is preferably on its pitch-line and to which a driving-shaft or connecting-rod 21 is attached. The pinion 18 must be exactly one-half the diameter of the internal gear-wheel on the pitch-lines. I have shown in the drawings a bracket-guide 22; but any suitable means may be employed to guide this rod 21 in a straight line coincident with the axes of the pinion and large bevel-gear.

When the elements of the device are assembled as shown in Fig. 1, the rectilinear motion of the wrist 20 is parallel to the support 4, because the bevel-gear and the pinion are so mounted that the center of the wrist and the axis of the bevel-gear are on a line parallel with the support 4; but if the pinion 18 were mounted differently—that is, with the wrist at any other point of the circle of the internal gear than that shown—the wrist would then travel in a straight line over the center of the internal gear in a different direction, and therefore any desired angle of travel to the support 4 may be readily secured without changing the fixed position of the support 4 or the internal gear-wheel 3. I have thus shown and described the preferable construction of my invention.

The operation is as follows: Upon revolving the bevel-pinion 13 the bevel gear-wheel is rotated, carrying with it the pinion 18, which, meshing with the internal gear-wheel, is thereby rotated, keeping the wrist 20 always on a line with the axis of the pinion and bevel gear-wheel, and as it moves across the internal gear-wheel in a straight line its motion is rectilinear. To this wrist 20 a connecting-rod 21 may be attached, the other end of which may be attached to any mechanism to be operated, or any other attachment may be made to the wrist adapted to the mechanism to be operated.

Having thus described my invention, what I claim as new, and desire to secure by Letters Patent, is—

In combination with a platform, a bracket consisting of the supports and the three radiating arms having a bearing at the junction of the arms and a sleeve-bearing projecting from one side of the arms at the junction thereof, of a shaft mounted in said bearing, a large wheel carried by said shaft, said wheel provided with a spur-gearing upon the under side of one side of its periphery or flange and a bevel-gearing upon the opposite side under the flange, a casing connected to said arms upon the opposite side of the wheel, a pinion supported by said casing and meshing with the spur-gearing of the wheel, a shaft journaled in said bearing-sleeve, a bevel-pinion carried by said shaft and meshing with said bevel-gearing of the wheel, and a crank to revolve said shaft.

In testimony whereof I have signed my name to this specification in presence of two subscribing witnesses.

BRITTON POULSON.

Witnesses:
H. C. HARTMAN,
R. E. THAIN.